United States Patent [19]

Bell

[11] Patent Number: 4,936,088
[45] Date of Patent: Jun. 26, 1990

[54] LOW NOX COGENERATION PROCESS
[75] Inventor: Ronald D. Bell, Austin, Tex.
[73] Assignee: Radian Corporation, Austin, Tex.
[21] Appl. No.: 252,778
[22] Filed: Oct. 3, 1988

Related U.S. Application Data

[63] Continuation-in-part of Ser. No. 122,067, Nov. 18, 1987, Pat. No. 4,811,555.

[51] Int. Cl.$^5$ .............................................. F02C 3/34
[52] U.S. Cl. ................................. 60/39.06; 60/39.07; 60/39.52; 60/723
[58] Field of Search ................ 60/39.02, 39.06, 39.07, 60/39.182, 39.5, 39.52, 723; 122/7 R, 7 B; 431/7, 170

[56]  References Cited

U.S. PATENT DOCUMENTS

| 4,204,401 | 5/1980 | Earnest | 60/39.52 |
| 4,257,223 | 3/1981 | Enga | 60/39.182 |
| 4,375,949 | 3/1983 | Salooja | 431/7 |
| 4,405,587 | 9/1983 | McGill et al. | 431/4 |
| 4,459,126 | 7/1984 | Krill et al. | 431/170 |
| 4,572,110 | 2/1986 | Haeflich | 122/7 R |
| 4,594,850 | 6/1986 | Joy | 60/723 |

Primary Examiner—Louis J. Casaregola
Attorney, Agent, or Firm—Klauber & Jackson

[57]  ABSTRACT

A process for low NOX cogeneration to produce electricity and heat which involves combusting fuel to produce a gaseous stream of combustion products, passing the gaseous stream through a turbine to generate electricity, and to produce a gaseous exhaust stream, adding additional fuel to the exhaust stream, to provide a fuel-rich gas stream having fuel in excess of the oxygen in the combustible gas stream, treating the fuel-rich gas stream in a reducing atmosphere to produce a heated oxygen-depleted gaseous stream, converting at least a portion of the heat in the oxygen depleted stream into steam, adding air to the oxygen-depleted stream to produce a stoichiometric excess of oxygen in the resultant stream relative to fuel present in the resultant stream, passing the resultant stream over an oxidizing catalyst to produce an oxidized gaseous stream, removing heat from the oxidized stream, and venting the resultant cooled stream, the process further providing for cycling to the combusting step at least some of the oxidized gaseous stream. An apparatus system for carrying out this process is also provided.

16 Claims, 1 Drawing Sheet

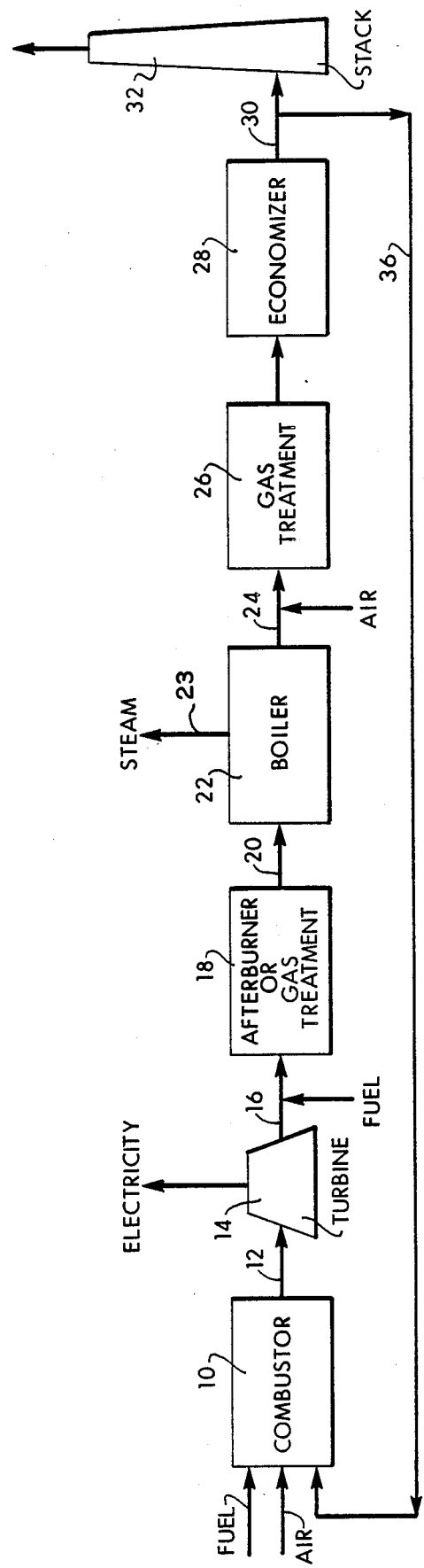

LOW NOX COGENERATION PROCESS

REFERENCE TO RELATED APPLICATION

This is a continuation-in-part of Ser. No. 122,067, filed Nov. 18, 1987 (U.S. Pat. No. 4,811,555).

FIELD OF THE INVENTION

This invention relates to cogeneration and is more particularly concerned with a cogeneration process which ensures low NOX content of the evolved gases.

BACKGROUND OF THE INVENTION

Some combustion processes generate effluent gases having an unacceptable NOX content. Thus, oxides of nitrogen are one of the principal contaminants emitted by combustion processes. In every combustion process, the high temperatures at the burner result in the fixation of some oxides of nitrogen. These compounds are found in stack gases mainly as nitric oxide (NO) with lesser amounts of nitrogen dioxide ($NO_2$) and only traces of other oxides. Since nitric oxide (NO) continues to oxidize to nitrogen dioxide ($NO_2$) in the air at ordinary temperatures, there is no way to predict with accuracy the amounts of each separately in vented gases at a given time. Thus, the total amount of nitric oxide (NO) plus nitrogen dioxide ($NO_2$) in a sample is determined and referred to as "oxides of nitrogen (NOX).

Oxides of nitrogen emissions from stack gases, through atmospheric reactions, produce "smog" that stings eyes and causes acid rains. For these reasons, the content of oxides of nitrogen present in gases vented to the atmosphere is severely limited by various state and federal agencies.

Cogeneration is a process which emits stack gases of undesirable NOX content.

Cogeneration is the simultaneous production of both useful thermal energy (usually steam) and electrical energy from one source of fuel. One or more gas turbines followed by a waste heat boiler using natural gas as fuel for both the turbines and to heat the exhaust gases from the turbines represent a typical system.

In recent years, the cogeneration market has expanded rapidly due in part to the Public Utility Regulatory Policy Act of 1978. PURPA gave financial incentive to cogenerators that sell excess electrical power and requires that utilities purchase power from cogenerators. It also allows utilities to own up to 50% of a cogeneration facility and receive the benefits of this status.

One problem with this system is the level of NOX emissions generated with the combined firing cycle. Cogeneration plants using conventional gas turbines and auxiliary fuel fired heat recovery boilers to produce electricity and steam are being subjected to stringent $NO_X$ emission standards requiring levels below the 150 ppm range. New Source Performance Standards (NSPS) strictly limit NOX emission. To meet the regulations for NOX emissions, several methods of NOX control have been employed. These can be classified as either equipment modification or injection methods. Injection methods include injection of either water or steam into the combustion zone to lower the flame temperature and retard the formation of NOX, since the amount of NOX formed generally increases with increasing temperatures, or injection of ammonia to selectively reduce NOX. Water or steam injection, however, adversely affects the overall fuel efficiency of the process as energy is absorbed to vaporize the water or heat the steam that otherwise would go toward heating the turbine gas and be ultimately converted into usable electricity or steam. A process involving the injection of ammonia into the products of combustion is shown, for example, in Welty, U.S. Pat. No. 4,164,546. Examples of processes utilizing ammonia injection and a reducing catalyst are disclosed in Sakari et al, U.S. Pat. No. 4,106,286; and Haeflich, U.S. Pat. No. 4,572,110. Selective reduction methods using ammonia injection are expensive and somewhat difficult to control. Thus, these methods have the inherent problem of requiring that the ammonia injection be carefully controlled so as not to inject too much and create a possible emission problem by emitting excess levels of ammonia. In addition the temperature necessary for the reduction of the oxides of nitrogen must be carefully controlled to get the required reaction rates.

Equipment modifications include modifications to the burner or firebox to reduce the formation of NOX. Although these methods do reduce the level of NOX, each has its own drawbacks. Combustion equipment modification affects the performance of the turbines and limits the range of operation. Moreover, cogeneration plants of this type employed for generating electric power and steam are being subjected to increasingly stringent NOX emission standards, and a satisfactory emission control system is required to minimize the undesirable emissions exhausted to the atmosphere. A selective catalytic reduction system is presently considered by some authorities to be the best available control technology for the reduction of NOX from the exhaust gas of a cogeneration plant, and as a consequence is required equipment. Currently available selective catalytic reduction systems used for the reduction of NOX employ ammonia injection into the exhaust gas stream for reaction with the NOX in the presence of a catalyst to produce nitrogen and water vapor. Such systems typically have an efficiency of 80-90 percent when the exhaust gas stream is at temperature within a temperature range of approximately 600°-700° F. The NOX reduction efficiency of the system will be significantly less if the temperature is outside the stated temperature range and the catalyst may be damaged at higher temperatures.

The turbine exhaust temperature of most gas turbine cogeneration plants, at full or rated load of the gas turbine is conventionally between approximately 775° F. and 1050° F. Since the exhaust gas temperature is above the optimum temperature range of the usual selective catalytic reduction system, it is necessary to reduce the temperature of the exhaust gas stream before it passes through the system. Current practice is to provide steam superheater and/or steam generating tubes upstream of the system to withdraw heat from the exhaust gas stream to cool the gas and produce steam before it passes through the system. Where supplementary firing is provided to increase steam production, the supplementary firing is conventionally carried out with an excess of air.

It is therefore an object of the present invention to provide a cogeneration system of the type described wherein the level of NOX in the emissions is lowered in an improved manner.

It is another object of the invention to provide a cogeneration system wherein NOX emissions are controlled without adversely affecting the operation of the turbine.

It is a further object of the invention to provide a cogeneration system embodying a gas turbine wherein NOX emissions are reduced without adversely affecting the fuel efficiency of the system.

It is a still further object of the invention to provide for NOX removal in a cogeneration system employing a gas turbine which is more economical and more readily controlled than systems heretofore commonly employed in the cogeneration art.

BRIEF SUMMARY OF THE INVENTION

In accordance with the invention, a cogeneration system is provided wherein electrical power is generated by a gas turbine, the gaseous effluent together with sufficient additional fuel to produce a fuel-rich, fuel-air mixture is fed to a boiler to generate steam. Air is added to the gaseous effluent from the boiler to form a lean fuel-air mixture, and this mixture is passed over an oxidizing catalyst, with the resultant gas stream then passing to an economizer or low pressure waste heat boiler for substantial recovery of its remaining heat content, and the gas, now meeting NOX emission standards, is thereafter vented to the atmosphere. It is a feature of the invention that at least some of the final effluent, i.e., the effluent from the economizer or low-pressure waste-heat boiler, is circulated to the combustor supplying gas to the turbine.

BRIEF DESCRIPTION OF THE DRAWINGS

The figure is a diagramatic flow sheet of a cogeneration system embodying a gas turbine and embodying aspects of the present invention.

DETAILED DESCRIPTION OF PREFERRED EMBODIMENTS

Referring now to the drawing, the reference numeral 10 designates a combustor or burner defining a combustor zone which receives fuel such as gas or naptha and compressed air and burns the air-fuel mixture to produce a gaseous effluent which passes into a duct 12 which directs it to a gas turbine 14 which is coupled to a generator (not shown), to produce electrical power. The turbine exhaust gas loaves through a duct 16 into which are introduced further amounts of fuel, the amount depending upon the fuel-air ratio in the exhaust gas from the turbine. Since there will be ample air, only fuel is injected at this point. The amount of fuel added is selected so that there will be 10 to 25% stoichiometric excess fuel relative to the available oxygen in the exhaust gas from the gas turbine. The fuel added is ordinarily gas, such as natural gas. Thus, the exhaust gaseous stream from the turbine is treated, i.e., has fuel added to it, to produce a fuel-rich, fuel-air mixture containing 10% to 25% excess of fuel over the oxygen stoichiometrically present. The thus-treated exhaust gas from the turbine can then be passed to a unit which is an afterburner wherein it is burned at a temperature of about 2000° to 3000° F. as described in parent application Ser. No. 122,067, the disclosure of which is incorporated herein by reference. A residence time of 0.5 seconds is required to ensure that the desired reduction of the oxides of nitrogen will occur. A greater residence time can be employed, e.g., 1 minute or more, but serves no useful purpose. It is also contemplated that the afterburner of unit 18 can be replaced by a catalytic treatment, as disclosed in the application of Ronald D. Bell entitled "Low NOX Cogeneration Process", being filed concurrently herewith, the disclosure of which is incorporated herein by reference. As disclosed in that application, the fuel-enriched exhaust gas from the turbine is then passed to a catalytic treatment zone 18, wherein the fuel-rich stream is passed over a reducing catalyst, e.g. platinum-rhodium in the zero-valent state supported on a carrier such as alumina, silica or a metal alloy. The making of such catalysts is well known to persons skilled in the art. Catalyst volumes will vary depending on the particular catalyst used. Ordinarily, the quantity of catalyst and the flow rate are such that the space velocity is typically in the range of 30,000 to 50,000 hr.$^{-1}$, preferably 30,000 to 40,000 hr.$^{-1}$.

As the present Applicant has disclosed in Mc Gill et al 4,405,587, of which he is a co-patentee, oxides of nitrogen can be reduced by reaction in a reducing atmosphere at temperatures in excess of 2000° F., for example 2000° to 3000° F. Combining this observation with a gas turbine operation to generate electricity, maximum utilization of the turbine exhaust as useful heat to generate steam can be achieved. Products from the afterburner or the catalytic treatment zone 18 pass to and through a waste-heat boiler wherein they are cooled to a temperature of 500–600° F. Thus, the heated gaseous stream passes into a duct 20 and is led to a waste-heat boiler 22 which effectively utilizes the heated gaseous stream to produce steam and simultaneously to cool the stream.

The gaseous effluent from the catalytic-treatment step, when it is used, which is ordinarily at a temperature of 1000–1400° F., passes to and through a waste-heat boiler wherein the effluent is cooled to a temperature of about 500–600° F. Thus, the heated gaseous stream from catalytic-treatment zone 18 passes into a duct 20 and is led to a waste-heat boiler 22 which effectively utilizes the heated gaseous stream to produce steam and simultaneously to cool the stream. The generated steam is removed via line 23.

In any case, the boiler 22, discharges a waste effluent gas into a duct 24. Because of the addition of fuel to the duct 16 and the burning or catalytic treatment of the turbine exhaust gas in the presence of this fuel with significantly less than the stoichiometric requirement of oxygen, i.e., under reducing conditions, the exhaust gas in duct 24 from the boiler 22 contains not only combustion gases, but some unburned fuel. It is, however, low in NOX and the treatment of the gases flowing through the system has brought about a reduction of any NOX formed, or a suppression of the formation of the NOX, without the use of ammonia or like treating system widely used in the prior art. In order, however, to utilize to a maximum the heat potential of the gas and any fuel which it may contain, air is added to the stream in conduit 24 and the resulting gaseous stream is passed to a gas treatment unit 26 wherein the gas stream is passed over an oxidizing catalyst. The amount of air is added in an amount relative to the stream in conduit 24 such that the resulting stream will contain oxygen soichiometrically in excess of the amount needed to burn any fuel which may be present in the stream, e.g., 10% to 50% excess. Thus products at the boiler discharge temperature, e.g., 500°-600° F. are mixed with air and passed over an oxidizing catalyst. Either noble metal catalysts such as platinum or palladium or base metal oxides, such as copper oxide, chrome oxide, or manganese oxide, or the like, may be used for this purpose. The noble metal catalysts, e.g., platinum or palladium catalysts, are most suitably the noble metals deposited in the zero valent state upon a support, such as alumina, silica, kiesel-guhr, or a metal alloy, and the like. The metal oxide catalysts are also most suitably the metal oxides supported on supports of this character. The making of such catalysts is well known to persons skilled in the art. Catalyst volumes will vary depending on the particular catalyst used. Ordinarily, the quantity of catalyst and the flow rate are such that the space velocity is typically in the range of 30,000 to 50,000 hr.$^{-1}$. Data indicate that NOX levels in the parts per billion range can be realized by the combined reduction-oxidation operations of this invention. The oxidized gaseous effluent from the unit 26 passes into a conduit 27 which leads an economizer or a low-pressure, waste-heat boiler, or the like, indicated at 28, and the heat content of the oxidized gaseous effluent is extracted to the maximum amount economically feasible. The cooled gas at a temperature of about 300 to 400° F. is then discharged through an outlet conduit 30 into a stack 32 and vented to the atmosphere with the assurance that the vented effluent will comply with NOX emission standards. It will have a NOX content of less than 50 ppm.

It is a feature of the present invention that treated gaseous effluent from conduit 30, i.e., the low NOX effluent following passage of the gas stream through the oxidizing catalytic treatment of the gas and the subsequent heat removal in the economizer is cycled to combustor 10 wherein the gas stream to be fed to turbine 14 is prepared. Thus, as seen in the drawing, when effluent, e.g. flue gas, is to be re-cycled, an appropriate valve (not shown) controls the recycle rate. At least a portion of the effluent is diverted into line 36 which conducts the diverted effluent to combustor 10. In turbine operation, air is added to the combustor for combustion of the fuel and a large excess of air is also added to keep the flame temperature in the combustor from becoming so high that the generated gas will damage the blades of the turbine. It has been observed that the re-cycled effluent gas acts as a heat sink in the combustor and makes it possible readily to prevent the turbine from over-heating. Thus, the large excess of air ordinarily added to control the flame temperature can be eliminated so that there is less oxygen in the effluent gas and there is an important saving of fuel needed to produce reducing conditions.

As mentioned, in view of the presence of cycled effluent in combustor 10, the oxygen content of the turbine exhaust will be significantly lower, which will correspondingly lower the fuel requirement for the subsequent reducing step. The quantity of effluent diverted can vary but, for best results the quantity of recycled effluent, e.g. flue gas, added to the combustor will be such as is required to produce a turbine exhaust at a temperature of 800–1000° F. with 1–2% $O_2$.

An aspect of the invention is that the gas turbine 14 furnishes the total of the combustion-supporting air for the afterburner 18, if one is used, and that care is taken to maintain reducing conditions during this combustion or during the catalytic treatment at 18 by appropriate control of the supply of fuel. Another aspect of the invention is that heat recovery in a turbine cogeneration system is maximized in a highly economical manner and that NOX content is kept at a minimum without resort to elaborate equipment reconstruction, without heat loss by injecting water into the exhaust gases from the turbine, and without ammonia injection or catalytic reduction in the presence of ammonia.

It will, of course, be understood in the foregoing description of the drawing, reference to a combustor or heater, to a turbine, afterburner, boiler, waste-heat boiler, economizer, gas treatment unit, and the like, contemplates utilization of standard equipment well known to persons skilled in the art. The gas treatment units, for example, can be any containers adapted for gas passage and containing an appropriate catalyst. Similarly, the turbine 14, for example, can be of the type which produces substantially the same quantity of exhaust gas throughout the range of its operation, as, for example, a single cycle, single shaft gas turbine.

Minimizing the formation of oxides of nitrogen in cogeneration, in accordance with the invention, offers several advantages over the current state of the art. This process does not require that a potentially obnoxious gas, such as ammonia, be injected into the system; the reaction conditions do not require that a narrowly-controlled temperature be maintained for the reduction of oxides of nitrogen to occur; the operating conditions are compatible with conventional cogeneration conditions; and greater NOX reduction efficiencies can be achieved.

The following example will serve more fully to illustrate the features of the invention.

EXAMPLE 1

In a typical operation, a combustor is fed with natural gas and combustion air to produce a combustible mixture which is combusted at a temperature of 1700° F. to produce a stream of combustion products which are fed to a turbine to generate electricity. The exhaust stream from the turbine, at a temperature of 800–1000° F. contains about 14% oxygen. Natural gas at ambient temperature is injected into this exhaust stream to give the resultant stream a fuel content such that the fuel is 10% in stoichiometric excess relative to the oxygen present. The resultant stream is then combusted at a temperature of 3300° F. and, since the fuel is in excess, the combustion takes place in a reducing atmosphere. Heat present in the combustion products is at least partially converted into steam by heat exchange with water, e.g., in boiler tubes, and the resulting gaseous stream, which is of course, oxygen depleted, has a temperature of 500° F. To this oxygen-depleted stream is then added air at ambient temperature in an amount such that the resultant stream has an oxygen content which is 25–50% stoichiometrically in excess relative to any fuel present in the oxygen-depleted stream to which the air is added. The resultant oxygen-rich stream is then fed through a bed of platinum black (<1% supported on alumina) with a space velocity of 50,000 hr.$^{-1}$. At this point the gaseous stream being processed has a temperature of 500° F. This temperature increases across the catalyst bed to about 750° F. Heat is then extracted by appropriate heat exchange to leave a final stream to be vented having a temperature of about 350° F. and a NOX content of less than 50 ppm. In order to regulate combustion in the combustor preceding the turbine so that the gaseous effluent fed to the turbine is at a temperature of 1700° F., 60–65% of the final effluent stream is cycled to provide a ratio of 1.75:1.0 of recycled flue gas to combustion gases.

EXAMPLE 2

In a typical operation, a combustor is fed with natural gas to produce a combustible mixture which is combusted at a temperature of 1700° F. to produce a stream of combustion products which are fed to a turbine to generate electricity. The exhaust stream from the turbine, at a temperature of 800° F. contains about 14% oxygen. Natural gas at ambient temperature is injected into this exhaust stream to give the resultant stream a fuel content such that the fuel is 10% in stoichiometric excess relative to the oxygen present. The resultant stream is then passed over platinum-rhodium (<1% supported on alumina) at a space velocity of 30,000 hr.$^{-1}$ and, since the fuel is in excess, the treatment takes place in a reducing atmosphere. This catalytic treatment causes the temperature of the stream to rise to 1400° F. Heat present in the combustion products is at least partially converted into steam by heat exchange with water, e.g., in boiler tubes, and the resulting gaseous stream, which is of course, oxygen depleted has a temperature of 500° F. To this oxygen-depleted stream is then added air at ambient temperature in an amount such that the resultant stream has an oxygen content which is 50% stoichiometrically in excess relative to any fuel present in the oxygen-depleted stream to which the air is added. The resultant oxygen-rich stream is then fed through a bed of platinum black (<1% supported on alumina) with a space velocity of 50,000 hr.$^{-1}$. At this point the gaseous stream being processed has a temperature of 500° F. This temperature increases across the catalyst bed to about 750° F. Heat is then extracted by appropriate heat exchange to leave a final stream to be vented having a temperature of about 350° F. and a NOX content of less than 50 ppm. In order to regulate combustion in the combustor preceding the turbine so that the gaseous effluent fed to the turbine is at a temperature of 1700° F., 65% of the final effluent stream is cycled to provide a ratio of 1.75:1.0 of cycled effluent to combustion gases.

It will be understood that various changes may be made without departing from the invention as defined in the appended claims and it is intended, therefore, that all matter contained in the foregoing description and in the drawing shall be interpreted as illustrative only and not in a limiting sense.

I claim:

1. A process for low NOX cogeneration to produce electricity and heat which comprises combusting fuel to produce a gaseous stream of combustion products, passing said gaseous stream through a turbine to generate electricity, and to produce a gaseous exhaust stream, adding additional fuel to said exhaust stream, to provide a fuel-rich gas stream having fuel in excess of the oxygen in said fuel-rich gas stream, treating said combustible gas stream in a reducing atmosphere to produce a heated oxygen-depleted gaseous stream, converting at least a portion of the heat in said oxygen-depleted stream into steam, adding air to said oxygen-depleted stream to produce a stoichiometric excess of oxygen in the resultant stream relative to fuel present in said resultant stream, passing said resultant stream over an oxidizing catalyst to produce an oxidized gaseous stream, removing heat from said oxidized stream, and venting the resultant cooled stream, cycling a stream consisting of at least a portion of said oxidized stream to said combusting step.

2. A process as defined in claim 1, wherein said gaseous exhaust stream is at a temperature of 775° to 1050° F.

3. A process as defined in claim 1, wherein said fuel is added to said gaseous exhaust in an amount 10% to 25% stoichiometrically in excess of the oxygen present in the resultant combustible gas stream.

4. A process as defined in claim 1, wherein said combustible gas stream is treated by combusting it at a temperature of 2000 to 3000° F.

5. A process as defined in claim 4 wherein said combustible gas stream has a residence time 0.5 seconds during its combustion.

6. A process as defined in claim 1 wherein said fuel-rich stream is treated by means of a reducing catalyst.

7. A process as defined in claim 1, wherein said oxygen-depleted stream is cooled to a temperature of about 500–600° F. during said conversion of the heat to steam.

8. A process as defined in claim 1, wherein the space velocity of said resultant stream passing over said oxidizing catalyst is about 30,000 to 50,000 hr.$^{-1}$.

9. A process as defined in claim 1, wherein said air is added to said oxygen-depleted stream in an amount to provide a stoichiometric excess of oxygen present in the resultant stream of 10 to 25%.

10. A process as defined in claim 1, wherein the cooled gas vented to the atmosphere is at a temperature of about 350 to 500° F.

11. A process as defined in claim 1, wherein the cooled gas vented to the atmosphere has a NOX content less than 50 ppm.

12. A process as defined in claim 1, wherein said cycled stream is 60–65% of said oxidized stream.

13. A system for low NOX cogeneration to produce electricity and heat which comprises means for combusting fuel to produce a gaseous stream of combustion products, a turbine connected to generate electricity, conduit means for passing said gaseous stream through said turbine to effect generation of electricity, conduit means for passing the gaseous exhaust stream from said turbine, means for adding additional fuel to said exhaust stream to provide a fuel-rich gas stream having fuel in excess of the oxygen in said combustible gas stream, means for treating said fuel-rich gas stream in a reducing atmosphere to produce a heated oxygen-depleted gaseous stream, means for converting at least a portion of the heat in the gaseous stream treated in said treating means into steam, means for adding air to said last-named stream to produce a stoichiometric excess of oxygen in the resultant stream relative to fuel present in said resultant stream, gas passage means containing an oxidizing catalyst, conduit means for passing said resultant stream into said gas passage means and over said oxidizing catalyst to produce an oxidized gaseous stream, means for removing heat from said oxidized stream, conduit means for passing said oxidized gaseous stream from said gas passage means to said means for removing heat, a vent, a gas conduit connecting said means for removing heat to said vent, and means for cycling said oxidized gaseous stream to said combusting means.

14. A system as defined in claim 13, wherein said means for removing heat is an economizer.

15. A system as defined in claim 13, wherein said vent is a stack.

16. A system as defined in claim 13, wherein said converting means is a boiler.

* * * * *